(12) United States Patent
Yu

(10) Patent No.: US 6,621,722 B1
(45) Date of Patent: Sep. 16, 2003

(54) RECTIFIER CIRCUITS WITH LOW FORWARD VOLTAGE JFET DEVICE

(75) Inventor: Ho-Yuan Yu, Saratoga, CA (US)

(73) Assignee: Lovoltech, Inc., Santa Clara, CA (US)

( * ) Notice: Subject to any disclaimer, the term of this patent is extended or adjusted under 35 U.S.C. 154(b) by 0 days.

(21) Appl. No.: 09/690,690

(22) Filed: Oct. 16, 2000

Related U.S. Application Data

(63) Continuation of application No. 09/453,136, filed on Dec. 2, 1999.
(60) Provisional application No. 60/111,197, filed on Dec. 7, 1998.

(51) Int. Cl.⁷ .............................................. H02M 7/217
(52) U.S. Cl. ...................................................... 363/127
(58) Field of Search .......................... 363/44, 52, 125, 363/127, 128

(56) References Cited

U.S. PATENT DOCUMENTS

| | | | | |
|---|---|---|---|---|
| 4,419,586 A | * | 12/1983 | Phipps | 250/551 |
| 4,519,024 A | * | 5/1985 | Federico et al. | 363/127 |
| 4,853,561 A | * | 8/1989 | Gravrok | 307/443 |
| 5,038,266 A | * | 8/1991 | Callen et al. | 363/89 |
| 6,011,703 A | * | 1/2000 | Boylan et al. | 363/21 |
| 6,028,778 A | * | 2/2000 | Amano | 363/40 |
| 6,064,580 A | * | 5/2000 | Watanabe et al. | 363/17 |
| 6,069,809 A | * | 5/2000 | Inoshita | 363/98 |
| 6,084,792 A | * | 7/2000 | Chen et al. | 363/127 |
| 6,104,172 A | * | 8/2000 | Josephs et al. | 323/222 |
| 6,236,257 B1 | * | 5/2001 | Si et al. | 327/379 |
| 6,404,157 B1 | * | 6/2002 | Simon | 318/445 |
| 6,439,678 B1 | * | 8/2002 | Norton | 347/9 |

* cited by examiner

*Primary Examiner*—Adolf D. Berhane
(74) *Attorney, Agent, or Firm*—Wagner, Murabito, & Hao LLP

(57) ABSTRACT

This invention discloses rectifying circuits using normally "off" Junction Effect Transistor. By connecting the gate of the JFET to the higher bias terminal of the output coil of the transformer, the forward biased turn on function of the normally "off" JFETs can be achieved. Therefore, the normally "off" JFET can be used as synchronized zero voltage switching rectifier with very low voltage drop. Since normally "off" JFET is a majority carrier device, very high frequency response can be achieved. This kind of circuitry can replace the P-N junction and/or Schottky rectifiers especially when the supply voltage drops below three volts.

11 Claims, 6 Drawing Sheets

FULL WAVE RECTIFYING CIRCUIT

SYMBOLS OF NORMALLY "ON" AND NORMALLY "OFF" JFETs AND MESFETs. PAGE 323, S. M. SZE, "PHYSICS OF SEMICONDUCTOR DEVICES", 2ND EDITION, JOHN WILEY & SONS, 1981

DEVICE DIAGRAM

HALF WAVE RECTIFYING CIRCUIT

EQUIVALENT CIRCUIT OF FIGURE 4

FULL WAVE RECTIFYING CIRCUIT

US 6,621,722 B1

RECTIFIER CIRCUITS WITH LOW FORWARD VOLTAGE JFET DEVICE

This is a continuation of copending application Ser. No. 09/453,136 filed on Dec. 2, 1999 which is hereby incorporated by reference to this specification which designated the U.S.

This application is a continuation of Ser. No. 09/453,136 filed Dec. 2, 1999, which claims a priority date of Dec. 7, 1998, benefited from a previously filed Provisional Application No. 60/111,197 filed on Dec. 7, 1998 by a same Inventor of this Patent Application.

BACKGROUND OF THE INVENTION

1. Field of the Invention

This invention relates to the rectifying of alternating current (AC) into direct current (DC) by a normally "off" Junction Field Effect Transistor (JFET) that provides very low voltage drop across the source and drain for AC to DC power supplies or converters in low voltage application. The gate of this device is connected to the higher voltage terminal of three output terminals of the transformer. The gate turns-on the JFET when the gate is in forward bias above the threshold voltage of the normally "off" JFET. Since the threshold voltage of this normally "off" JFET can be set below 0.3 V and the forward bias of 0.5 V or less at the gate can sufficiently turn-on the device, a very low voltage drop to below 0.1 V across source and drain of the device can be realized at on state of this device. The current required to switch the device is only two to five times of orders of magnitude smaller than the current across the source and drain. Therefore very efficient rectifying for low voltage application is achieved.

2. Description of the Prior Art

As the technology moves toward deep submicron ranges, the required power supply voltage is decreased from 2.5 V for 0.25 micron technology to under 1.0 V for 0.13 micron or advanced technology. Normal P-N junction with a forward voltage drop of 0.8 V to over 1.0 V is no longer adequate for the power supplier with output voltage of 5.0 V or lower due to its high power consumption during forward current flow. The standard Schottky rectifier is also not adequate for the power supply voltage below 3.3 V. Special Schottky rectifier offers low forward voltage drop to about 0.3 V, however, this kind of Schottky rectifier is limited to 100 degree C maximum junction temperature and its high reverse leakage current becomes unattractive to many applications.

The concept of Junction Field Effect Transistors (JFET) has been proposed after the invention of bipolar transistors. Due to its majority carrier nature, the JFET can be operated at very high frequency. However, because of its physical properties, this kind of device is only available in the market for normally "on" JFET. This means that the normally "on" JFET is at "on" state when there is no bias applied to the gate. At the reverse bias higher than the threshold voltage Vt, the gate turns off the current flow between source and drain. Without readily available normally "off" JFETs, JFETs are not widely used as the MOSFETs (Metal-Oxide-Semiconductor Field Effect Transistors). In order to make the normally "off" FET, the distance between the gates must be small enough so that the depletion regions from both gates fill up the conduction channel. No current flows when the gate is at zero bias. This means that at forward bias above the threshold voltage of the gate, the depletion region is small enough, the conduction channel between source and drain is then open.

S. M. Sze has clearly described this concept in page 323, "Physics of Semiconductor Devices", $2^{nd}$ edition, John Wiley & Son, 1981. The symbols for n-type and p-type normally "on" and normally "off" JFET and MESFET are illustrated in FIG. 1. However, in this book, the application of normally "off" FET is described for high speed and low power application. Since the original device structure has very long channel length that limits the current carrying capability and high on resistance.

From inventor's previous invention concepts, "Low On Resistance Transistors and the Method of Making" filed in Patent Office of Disclosed Document Program, Sep. 24, 1998, #444899, has disclosed the device structure for high current and low on resistance applications. This is a normally "on" JFET that offers high current and low on resistance for low voltage applications. Inventor's other concept, "Novel Structure of JFETs for Low Voltage Application", filed in Patent Office of Disclosed Document Program, Sep. 17, 1998, #444874 disclosed the device structure of normally off JFETs for low voltage and high current applications. The provisional patent application, #60/115,009, has been filed on Jan. 6, 1999 and utility patent application #09/430,500, was filed on Oct. 29, 1999. The full disclosures of application #60/115,009 and application #09/430,500 are incorporated herein by reference.

SUMMARY OF THE PRESENT INVENTION

This invention uses a normally "off" Junction Field Effect Transistor (JET) to rectify AC current into DC current. With proper connection to the output terminals of the transformer, this device offers low forward voltage drop to below 0.1 V. Extremely low forward voltage, fast switching, low recovery time and low reverse leakage current of this type of device offer many advantages for low voltage applications. In order to control the gate effectively, the gate must be in forward bias condition respect to the source and drain. The distance between the gates, the doping concentration of the conduction channels and the gates, the thermal process cycles, the accuracy of lithography process and doping control determines the threshold voltage Vt. The threshold voltage is normally set between 0.2 V to over 0.3 V in order to operate the device up to 200-degree C. Therefore, the normal gate voltage in forward bias should be less than 0.7 V with voltage around 0.5 V preferred. This voltage (0.5 V) is sufficient enough to open the conduction channel between the gates in achieving of very low on resistance between source and drain. The key factor to operate this device effectively is to ensure the gate voltage in forward bias respect to source and drain. For normal P-N junction of silicon material, the current at forward bias of 0.5 V is 4 to 5 orders of magnitude less than at 0.8 V, therefore, this kind of normally "off" JFET offers extremely high current gain and low on resistance. Furthermore, since this is a majority carrier device, the device is much faster than the bipolar transistors.

This invention offers simple circuits connecting to the output side of the transformer by utilizing the normally "off" JFET for half wave or full wave rectifying. Similar approach can also apply to other complicated circuitry.

DETAILED DESCRIPTION OF THE PREFERRED

Embodiment

Figure 1:
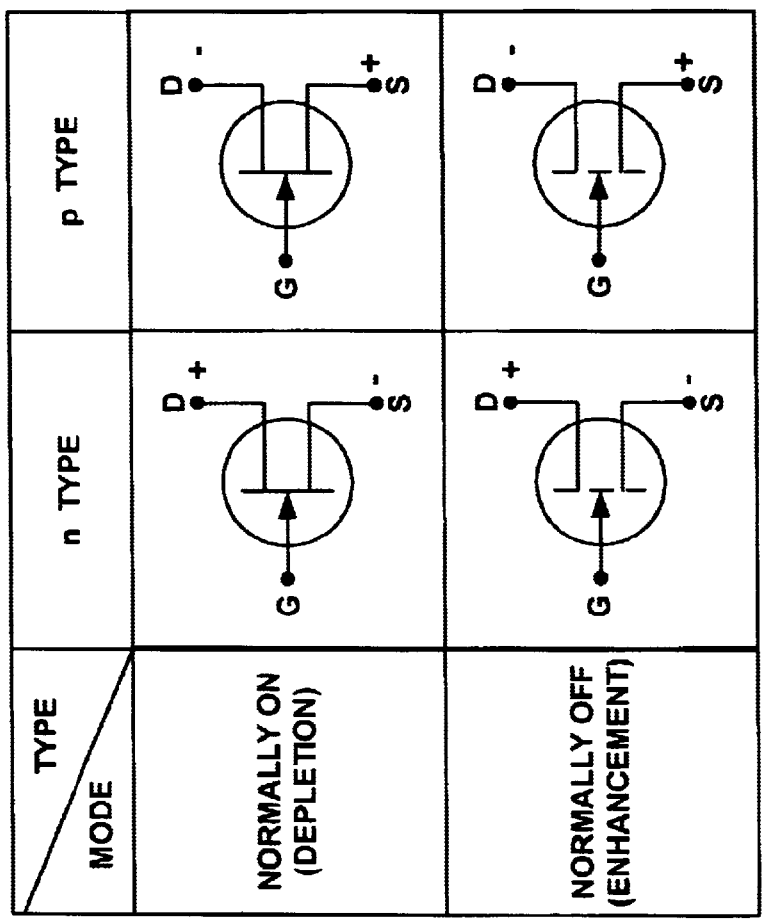
FIG. 1 shows the symbols of normally "on" and normally "off" JFETs and MESFETs for both N and P channels selected from page 323 of S. M. Sze, "Physics of Semiconductor Devices", $2^{nd}$ edition, John Wiley & Sons, 1981.
Figure 2:
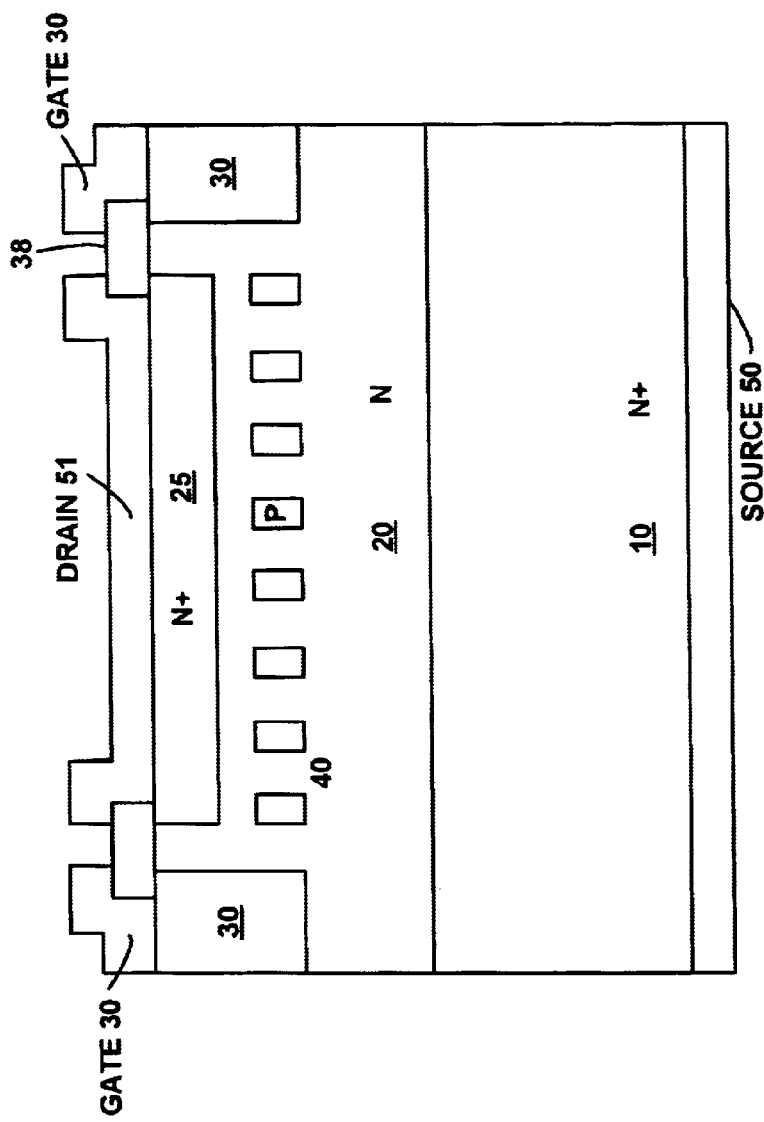
FIG. 2 illustrates the basic device structure for normally "off" FET.

FIG. 2 illustrates a normally "off" Junction Field Effect Transistor. An epitaxial layer 20 of same doping polarity is deposited on the top of heavily doped substrate 10. The control gate 30 is made by implant/diffusion, trench/doping material deposition, or double epitaxial process. A simple implant/diffusion method is shown in FIG. 2. The gate 30 is done by lithography and implant process. A layer of heavily implanted region 25 of same polarity of the epitaxial layer 20 is placed on the top of the gate grid. The purpose of region 25 is to form the ohmic contact to the drain 51. The gate is connected to the surface of the silicon wafer by connection implant or trench etch method. The oxide layer 38 is used to separate the gate 30 and drain 51. This oxide layer can be formed by thermal oxidation or by chemical vapor deposition of silicon dioxide. Drain 51 is formed by metallization process on the top of heavily doped N+ layer 25. The source 50 is formed by metallization process to the bottom of N+ substrate. This is an N-channel normally "off" JFET. By substituting the substrate 10 with P+, epitixial layer 20 with P type material, gate grid 30 with N type doping and the connection layer 25 with P+ doping, a P-channel normally "off" JFET is formed. The width W 40, distance between the gate grid 30, is determined by the lithography and the thermal process. By altering the width W 40 or channel doping concentration, the threshold voltage Vt can be adjusted. In order to achieve the normally "off" JFET, the width W must be sufficiently small that the conduction channel is filled up by the depletion regions from both sides of the gate grid 30. The channels between source 50 and drain 51 are turned-off when no voltage is applied to the gate in this conduction. Only forward bias above the threshold voltage at the gate 30 can reduce the depletion regions from both side of the gate grid 30 to open the conduction channels between the source 50 and drain 51. However, the current flow from the gate grid to the source and drain is insignificant when the forward voltage is below 0.5 V for silicon P-N junction. Therefore, large current gain can be obtained by this structure.

Figure 3:
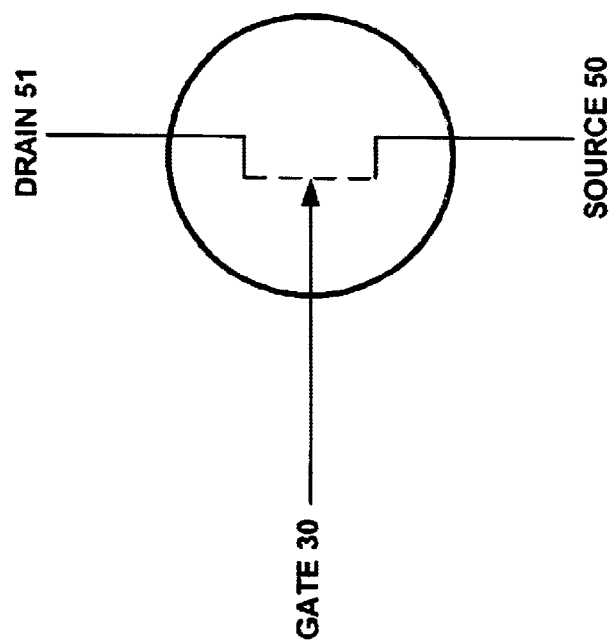
FIG. 3 shows the device structure for normally "off" FET.

FIG. 3 is the device diagram of this normally "off" JFET. The source 50 is located at the bottom of the device and drain 51 is located at the top of the device. This is an N-channel JFET. When the current flows from the gate 30 to source 50 and drain 51 in forward bias, the depletion layer between the gate grid leave a conduction path for the source and drain. This is the principle of current amplification action. With proper design of the device, the current gain can be 100 to over 10,000. When the gate voltage is less than the threshold voltage Vt or at reverse bias, this device is turned off.

Figure 4:
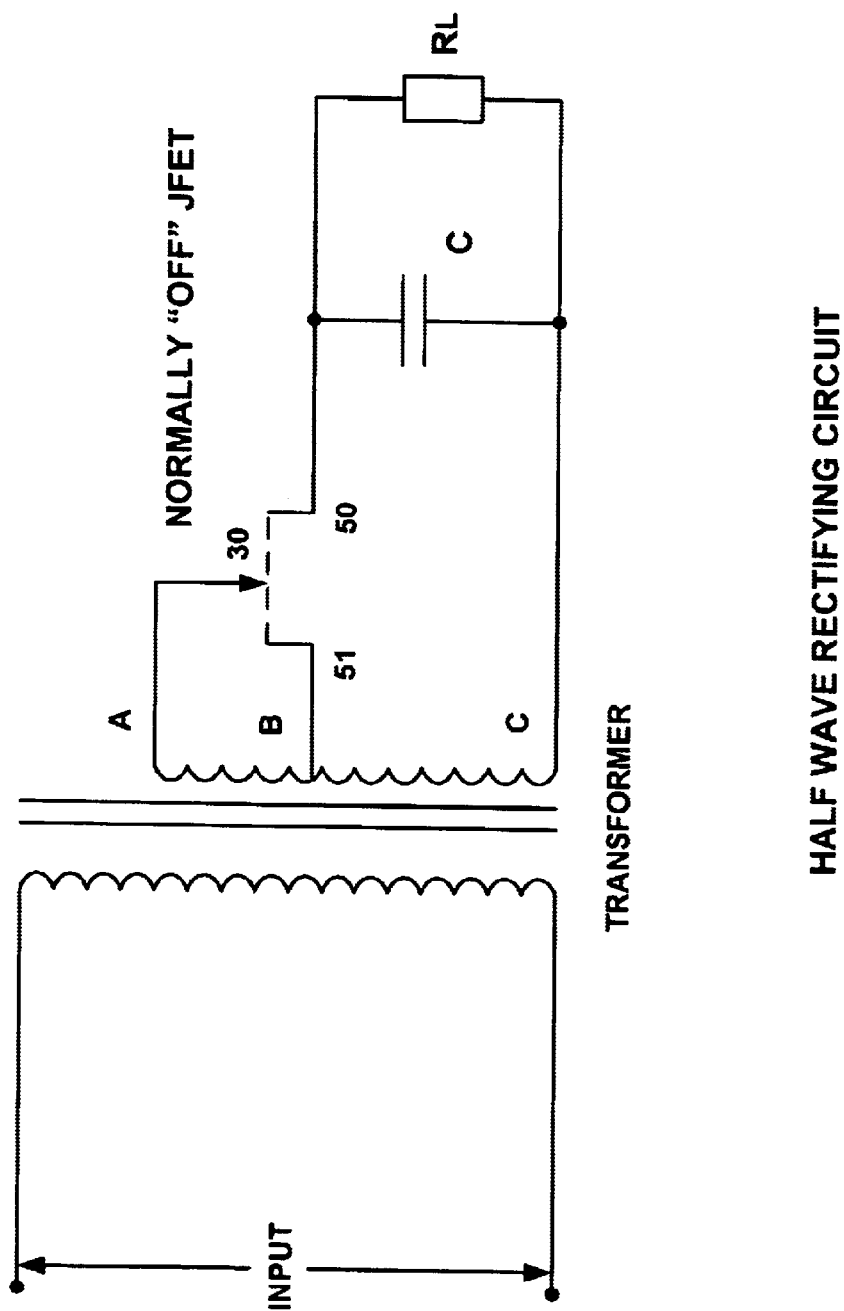
FIG. 4 discloses the circuitry connecting this normally "off" FET to the terminals of the output side of the transformers, by adding extra turns of coil higher bias is provided to the gate, thus, the device turn-on action is achieved.

FIG. 4 illustrates the half wave rectifier circuit. The input voltage is an AC source or a DC source switched by the switching transistor. Assuming that the transformer is a step-down version, at the output terminal of the transformer, an extra terminal A is added by additional coil winding to the output side of the transformer. By adjusting the ratio of the winding of AB and BC terminals, higher bias from both directions between the gate to source and gate to drain can be achieved. The drain 51 of the device is connected to the terminal B and the source 50 of the device is connected to the load. A capacitor C is connected between the source 50 and the terminal C. The load RL is connected to the source side of the JFET and the terminal C in parallel with the capacitor C. The capacitor C is used to store the energy when the device is switched on to provide partial DC voltage to the load. By adding extra coils for terminal A, a higher voltage is applied to the gate than the source and drain terminals. When the output transformer provides reverse bias to the gate and the source/drain region, no current flows between the source and drain, as well as between the gate and the device. When the output transformer is in forward bias, the extra forward voltage between the gate to the source/drain turns on the device. In order to protect the over current flowing through the gate, a current limit device can be connected between the gate and upper terminal of the transformer. This current limit device can also be built-in to the normally "off" JFET. A normally JFET without gate structure can be used as the current limiter.

Figure 5:
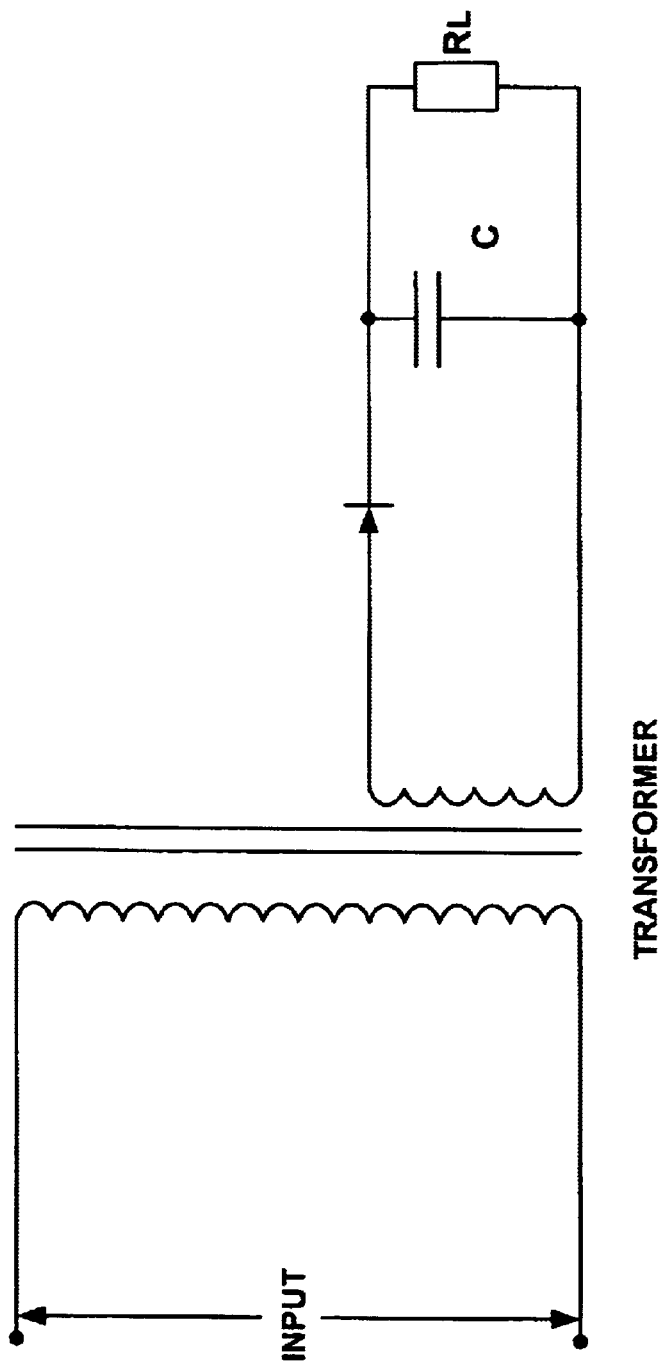
FIG. 5 shows the equivalent circuit of FIG. 4.

FIG. 5 is the equivalent circuit of FIG. 4. A simple diode can be considered as the circuit shown in FIG. 4. However, for normal rectifiers, a P-N junction has the forward voltage drop of 0.9 V to over 1 V; a normal Schottky rectifier has the forward voltage drop between 0.4 V to 0.65 V. By using normally "off" JFET, the circuit shown in FIG. 4 can provide the rectifying function to 0.1 V or less. This device is a majority device; therefore, the switch speed or the recovery time can be very fast and can be used for high frequency AC to DC conversion.

Figure 6:
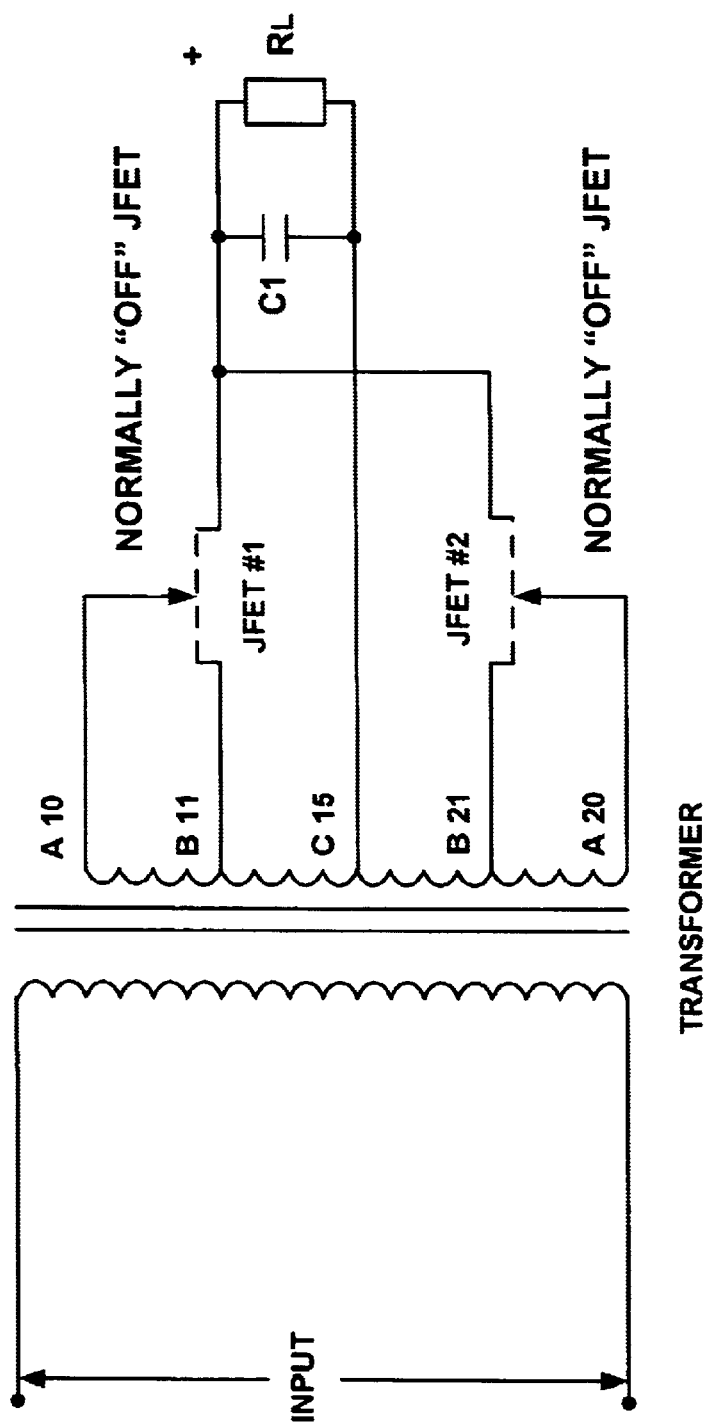
FIG. 6 discloses the circuitry of full wave rectifier using two normally "off" JFETs.

FIG. 6 is a full wave rectifying circuit. The secondary coil of the transformer comprises five terminals. Terminal A 10 provides the bias switching current to turn on the first normally "off" JFET at forward bias above threshold voltage Vt. The current flows from terminal B 11 to charge up the capacitor C1 and returned to the central terminal C 15. When the terminal A 20 is in positive polarity and above the threshold voltage, the second normally "off" JFET is turned-on. The current flows from terminal B 21 to capacitor C1 and returns to the terminal C 15. Thus this circuitry can charge the capacitor in either current directions. This is a very efficient circuitry for the AC to DC or DC to DC conversion especially for the low voltage applications.

With proper design of normally "off" FETS, this invention can provide the rectifying function to more than 100 ampere current with the reverse blocking voltage from 10 to more than 40 volts and the forward voltage drop at "on" state of the JFET to less than 0.1 V.

By using similar principles as illustrated in FIG. 4 and FIG. 6 for other applications in the power supplies and converters such as buck, boost and other complicated circuits. This invention utilizes the natural property of zero voltage switching characteristics of the normally "off" JFETs to achieve rectifying without using sophisticated circuitry.

We claim:

1. A half-wave rectifier circuit comprising:
   a transformer comprising: a two terminal input winding for receiving an alternating current input voltage; and a three terminal output winding comprising a bottom, a middle and a top terminal;

a normally-off junction field effect transistor (JFET) having a drain coupled to said middle terminal of said output winding and a gate comprising a gate grid array coupled to said top terminal of said output winding, said JFET having a forward voltage drop of less than 0.1 volt; and a capacitor having a first terminal coupled to said first terminal of said output winding and a second terminal coupled to a source of said normally-off JFET, said first and second terminals of said capacitor for receiving a load and for providing a direct current output voltage to said load.

2. A rectifier circuit as described in claim 1 wherein said transformer is a step-down version.

3. A rectifier circuit as described in claim 1 wherein the ratio of windings of said top to said middle terminals and said middle to said bottom terminals is adjusted to provide higher bias from both directions between said gate to said source and said gate to said drain of said normally-off JFET.

4. A rectifier circuit as described in claim 1 wherein extra windings are provided between said middle and top terminals such that a higher voltage is applied to said gate than said source and drain of said normally-off JFET.

5. A rectifier circuit as described in claim 4 wherein no current flows between said source and said drain of said JFET when said transformer provides reverse bias to said gate with respect to said source and drain and wherein said JFET conducts when said transformer provides forward bias between said gate and said source and drain.

6. A rectifier circuit as described in claim 1 further comprising a current limiting device coupled between said top terminal of said transformer and said gate of said normally-off JFET.

7. A rectifier circuit as described in claim 1 wherein said normally-off JFET has a near zero switching characteristic.

8. A full-wave rectifier circuit comprising:

a transformer comprising a two terminal input winding for receiving an alternating current input voltage and a five terminal output winding comprising terminals, from top to bottom: most bottom; second bottom; middle; second top; and most top;

a first normally-off junction field effect transistor (JFET) having a drain coupled to said second top terminal of said output winding and a gate, comprising a gate grid array, coupled to said most top terminal of said output winding, said first JFET having a forward voltage drop of less than 0.1 volt;

a second normally-off junction field effect transistor (JFET) having a drain coupled to said second bottom terminal of said output winding and a gate, comprising a gate grid array, coupled to said most bottom terminal of said output winding, said second JFET having a forward voltage drop of less than 0.1 volt; and a capacitor having a first terminal coupled to said middle terminal of said output winding and a second terminal coupled to a source of said first JFET and a source of said second JFET, said first and second terminals of said capacitor for receiving a load and for providing a direct current output voltage to said load.

9. The rectifier circuit as described in claim 8 wherein said first JFET is on and said second top terminal supplies current to said capacitor provided said most top terminal is in positive polarity and above the threshold voltage of said first JFET, said current then returning through said middle terminal and wherein said second JFET is on and said second bottom terminal supplies current to said capacitor provided said most bottom terminal is in positive polarity and above the threshold voltage of said second JFET, said current then returning through said middle terminal.

10. A rectifier circuit as described in claim 8 wherein said first JFET has a near zero switching characteristic and wherein said second JFET has a near zero switching characteristic.

11. A rectifier circuit as described in claim 8 wherein said full-wave rectifier circuit can provide a rectifying function to a more than 100 ampere current with reverse blocking voltage from 10 to more than 40 volts.

\* \* \* \* \*